United States Patent
Van Pelt et al.

(10) Patent No.: US 6,508,934 B2
(45) Date of Patent: Jan. 21, 2003

(54) FILTER CARTRIDGE WITH STRAP AND METHOD

(75) Inventors: Randall David Van Pelt, Salisbury, MO (US); Charles Grant Carothers, Glasgow, MO (US)

(73) Assignee: BHA Group Holdings, Inc., Kansas City, MI (US)

( * ) Notice: Subject to any disclaimer, the term of this patent is extended or adjusted under 35 U.S.C. 154(b) by 0 days.

(21) Appl. No.: 09/737,897

(22) Filed: Dec. 15, 2000

(65) Prior Publication Data

US 2002/0074279 A1 Jun. 20, 2002

(51) Int. Cl.[7] .......................... B01D 29/21; B01D 29/33; B01D 27/06
(52) U.S. Cl. .................... 210/232; 210/411; 210/493.1; 210/493.5; 55/498; 55/521; 55/DIG. 5; 264/271.1; 264/279; 264/DIG. 48
(58) Field of Search ............................... 210/232, 493.5, 210/493.1, 493.2, 411; 55/498, 521, DIG. 5; 264/271.1, 279, DIG. 48

(56) References Cited

U.S. PATENT DOCUMENTS

| 3,178,025 | A | * | 4/1965 | Brucken et al. |
|---|---|---|---|---|
| 3,189,179 | A | * | 6/1965 | McMichael |
| 3,306,794 | A | * | 2/1967 | Humbert, Jr. |
| 3,397,793 | A | * | 8/1968 | MacDonnell |
| 3,692,184 | A | * | 9/1972 | Miller, Jr. et al. |
| 3,752,321 | A | * | 8/1973 | McLaren |
| 4,402,830 | A | * | 9/1983 | Pall |
| 4,514,875 | A | * | 5/1985 | Comer |
| 4,652,285 | A | * | 3/1987 | Greene |
| 5,316,677 | A |   | 5/1994 | Harms, II |
| 5,730,766 | A |   | 3/1998 | Clements |
| 5,753,071 | A | * | 5/1998 | Spencer |

FOREIGN PATENT DOCUMENTS

GB 2214447 * 6/1989

* cited by examiner

Primary Examiner—Thomas M. Lithgow
(74) Attorney, Agent, or Firm—Greg Strugalski; Kyle L. Elliott

(57) ABSTRACT

A filter cartridge (20) for removing particulates from a particulate laden fluid stream moving one direction through the filter cartridge. The filter cartridge (20) is periodically subject to cleaning fluid moving in an opposite direction to the fluid stream. The filter cartridge (20) comprises filtration media (24) formed into a tubular configuration and having a plurality of circumferentially spaced apart pleats (26). A retention device (82) to limit radial movement of the filtration media (24) when subjected to the periodical cleaning fluid and to maintain the pleats (26) in the filtration media circumferentially spaced apart.

A method of making a filter cartridge (20) for removing particulates from a fluid stream moving one direction through the filter cartridge and that is periodically subject to cleaning fluid moving in an opposite direction to the fluid stream. The method comprises the steps of providing filtration media (24) formed into a generally tubular configuration and having a plurality of circumferentially spaced apart pleats (26). A retention device (82) is applied to limit radial movement of the filtration media (24) in the opposite direction when subjected to the periodic cleaning fluid and to maintain the pleats (26) in the filtration media circumferentially spaced apart.

18 Claims, 3 Drawing Sheets

FILTER CARTRIDGE WITH STRAP AND METHOD

BACKGROUND OF THE INVENTION

1. Technical Field

The present invention relates generally to a filter cartridge. In particular, the present invention relates to a retention strap for the filter cartridge and method of manufacturing the filter cartridge with the retention strap.

2. Description of the Prior Art

Filter cartridges that have pleated filtration media for filtering particulates from a particulate laden fluid stream moving in one direction through the filter cartridge are known. Such a filter cartridge is often subjected to cleaning fluid pulses moving for short periods of time through the filtration media in a direction opposite to the direction that the particulate laden fluid stream moves. Such a filter cartridge is referred to as a "pulse pleat" filter cartridge. Known retention straps encircle portions of the pulse pleat filter cartridge to prevent the filtration media from excessive movement during exposure to the cleaning fluid pulses.

However, the known retention straps for pulse pleat filter cartridges have drawbacks because they are difficult to install onto a filter cartridge and may not remain in the relative axial location they are initially placed in. For example, a known textile retention strap must be manually wrapped about the filtration media of the filter cartridge. The textile retention strap is typically tightened manually and the ends of the retention strap are overlapped. The ends of the retention strap are then adhered or fastened together while a desired tension is manually maintained on the retention strap.

It is important that the retention strap remain in a desired relative axial location along the filter cartridge to assure that the strap properly protect the filtration media from excessive movement during exposure to the cleaning fluid pulses. This is typically accomplished by the use of an adhesive. However, such an adhesive axial location device has been known to fail and the strap may become incorrectly positioned axially along the filter cartridge.

SUMMARY OF THE INVENTION

The present invention is directed to a filter cartridge for removing particulates from a particulate laden fluid stream moving one direction through the filter cartridge. The filter cartridge is periodically subjected to cleaning fluid moving in an opposite direction to the direction the particulate laden fluid stream moves. The filter cartridge comprises filtration media having a plurality of pleats. The filtration media is formed into a tubular configuration and has a plurality of circumferentially spaced apart pleats. Mounting structure is at a first axial end portion of the filtration media. An end cap is at a second axially opposite end portion of the filtration media. The filtration media is maintained in the generally tubular configuration by the mounting structure and the end cap. A retention device limits radial movement of the filtration media when subjected to the periodic cleaning fluid and maintains adjacent pleats in the filtration media circumferentially spaced apart.

The retention device comprises a thermoplastic elastomer material capable of withstanding the elevated operating temperatures and operating environment that the filter cartridge is exposed to. The retention device is attached to the filtration media. Each of the pleats of the filtration media has a tip and a pair of sides extending from the tip. The retention device engages and is adhered to at least one of the tips and sides of pleats of the filtration media. The retention device is applied to the filter cartridge during an extrusion operation. The retention device further includes reinforcement structure.

The present invention is also directed to a method of making the filter cartridge. The method comprises the steps of providing filtration media formed into a tubular configuration and having a plurality of circumferentially spaced apart pleats. Mounting structure is provided at a first axial end portion of the filtration media and an end cap at a second axially opposite end portion of the filtration media to maintain the filtration media in the generally tubular configuration. A retention device is applied to limit radial movement of the filtration media in the opposite direction when subjected to the periodical cleaning fluid and to maintain the pleats in the filtration media circumferentially spaced apart.

The retention device applying step further includes the step of providing a thermoplastic elastomeric material capable of withstanding the elevated operating temperatures and operating environment that the filter cartridge is exposed to. Each of the pleats of the filtration media has a tip and a pair of sides extending from the tip. The method also includes attaching the retention device to the filtration media. The retention device applying step further includes providing a retention device that engages at least one of the tips and sides of pleats of the filtration media. The retention device applying step further includes the step of extruding the retention device onto the filter cartridge. The extruding step further comprises the step of holding and rotating the filter cartridge while applying the retention device directly onto the filter cartridge. The retention device applying step further includes the step of providing reinforcing structure in the retention device. The providing reinforcing structure step further includes the step of extruding the retention device on to the filter cartridge. The method also includes the step of deforming a portion of the retention device between adjacent pleats.

BRIEF DESCRIPTION OF THE DRAWINGS

Further features of the present invention will become apparent to those skilled in the art to which the present invention relates from reading the following description with reference to the accompanying drawings, in which.

DESCRIPTION OF PREFERRED EMBODIMENTS

The present invention is embodied in a filter cartridge 20 (FIGS. 1 and 2) for removing particulates from a particulate laden fluid stream moving one direction through the filter cartridge. The filter cartridge 20 is particularly suitable for use in air pollution control applications. The filter cartridge 20 is a "pulse pleat" type of filter cartridge that is periodically subject to pulsed cleaning fluid moving in an opposite direction to the direction that the particulate laden fluid stream moves, as is known. Such a filter cartridge 20 may be subjected to over 300,000 cleaning pulses per year over a typical expected service life of about two years. The filter cartridge 20 is operably attached to a tube sheet 22 (FIG. 2) in a plenum (not shown) of a known baghouse (not shown).

Figure 1:
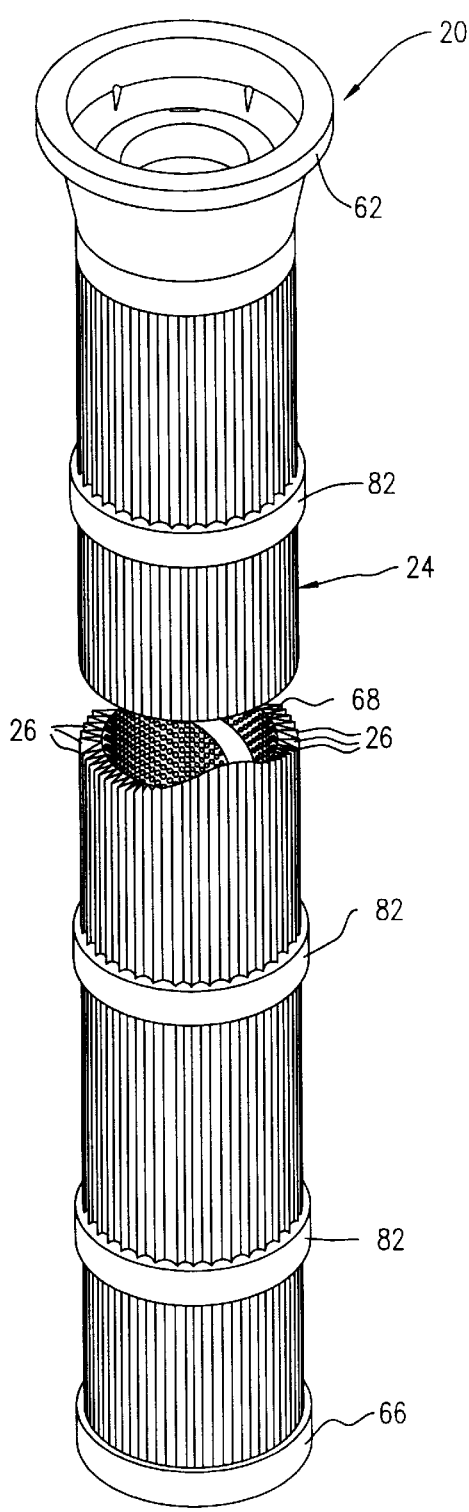
FIG. 1 is a perspective view of a filter cartridge incorporating a retention strap embodying the present invention.
Figure 2:
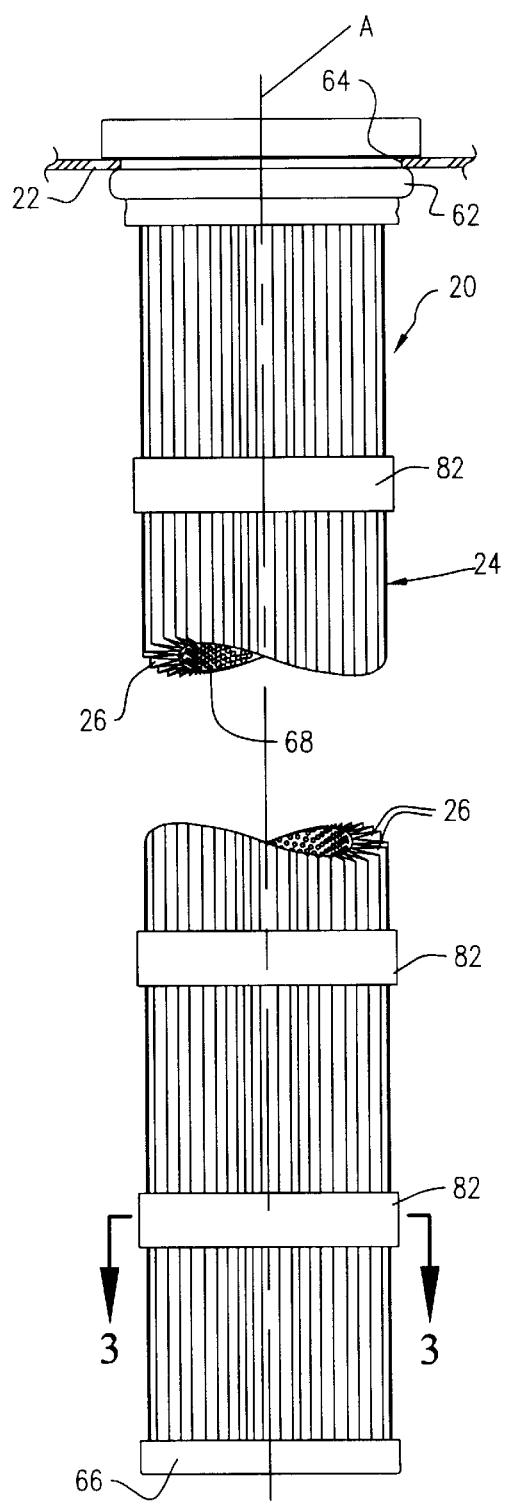
FIG. 2 is a side elevation view of the filter cartridge in FIG. 1.
Figure 3:
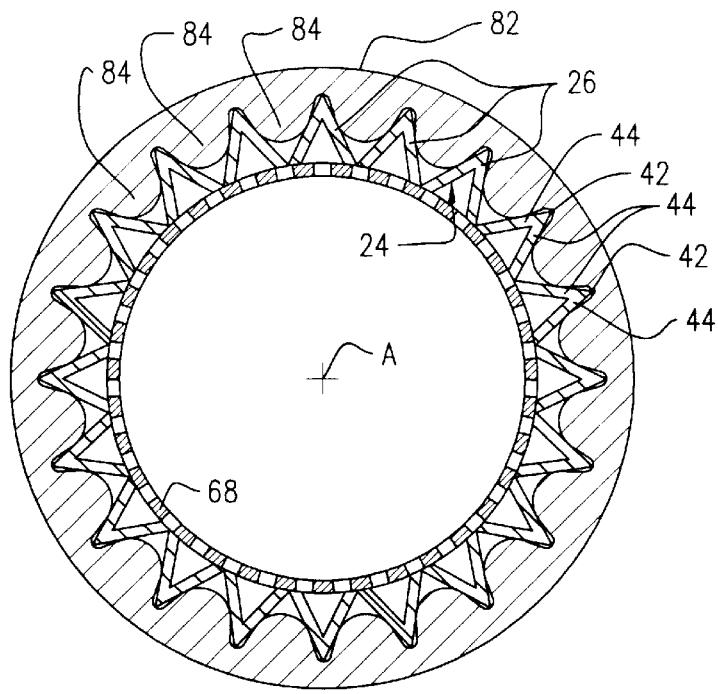
FIG. 3 is a cross-sectional view of the filter cartridge in FIG. 2, taken approximately along the line 3—3 in FIG. 2.
Figure 4:
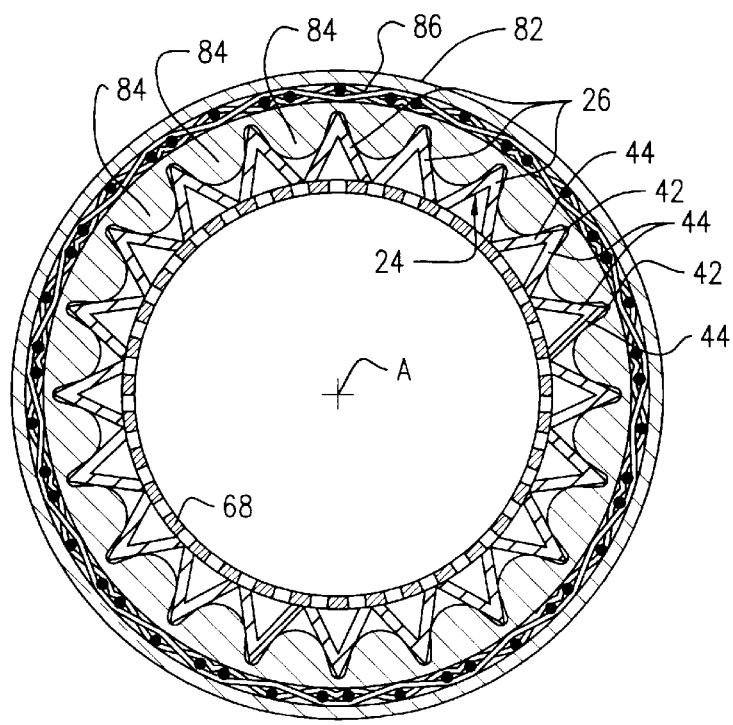
FIG. 4 is a view similar to FIG. 3 illustrating an alternate embodiment of the invention.

The filter cartridge 20 includes filtration media 24 that is formed into a generally tubular or cylindrical configuration, as illustrated in FIGS. 1 and 3–4, with a longitudinal central axis A. The filtration media 24 has a plurality of pleats 26 which are circumferentially spaced about the circumference of the filter cartridge 20. Each pleat 26 has a tip 42 formed at its radially outermost location, as viewed in FIGS. 1 and 3–4, and a pair of sides 44 extending radially inward from the tip. The pleats 26 in the filtration media 24 are not necessarily stiff and strong, thus, the pleats are prone to radially outward movement during a cleaning fluid pulse. Excessive radial outward movement of the filtration media 24 can damage the filtration effectiveness of the filter cartridge 20. Adjacent pleats 26 may also "collapse" and temporarily engage one another during a cleaning pulse or during a filtration cycle. When adjacent pleats 26 engage one another, there is a chance that the cleaning pulse or filtration operation will not be as effective as it should be because gas flow through that portion of the filtration media 24 can be temporarily blocked. Thus, it is desirable to prevent excessive radial movement of the filtration media 24 and collapse of the pleats 26.

Mounting structure 62 (FIGS. 1–2) is located at a first axial end portion of the filtration media 24 and filter cartridge 20. The mounting structure 62 is made of an elastomeric material for mounting and sealing the filter cartridge 20 in an opening 64 (FIG. 2) in the tube sheet 22. A known suitable material for the mounting structure 62 is preferably made from a molded urethane material. An end cap 66 is located at an axially opposite second axial end portion of the filtration media 24 and filter cartridge 20. The end cap 66 is preferably made from a molded urethane material. The filtration media 24 is potted and maintained in the generally tubular configuration by the mounting structure 62 and the end cap 66. A permeable support 68 is located radially inward of the filtration media 24 to prevent inward collapse of the filtration media 24 during exposure to the particulate laden fluid stream that is to be filtered.

The filter cartridge 20 also includes a retention device in the form of a plurality of retention straps 82, constructed according the present invention. The retention straps 82 limit radial movement of the filtration media 24 in the radially outward direction, opposite to the flow of the fluid stream to be filtered, when subjected to the periodical cleaning fluid. The retention straps 82 also serve to space apart and maintain adjacent pleats 42 spaced apart around the circumference of the filter cartridge 20.

Each retention strap 82 embodying the present invention is preferably made from a thermoplastic elastomeric material having sufficient strength and fatigue resistance to prevent excessive radial movement of the filtration media 24 during a cleaning pulse and maintain the pleats 26 spaced apart. The retention strap 82 is also capable of withstanding the elevated operating temperatures and operating environment, such as exposure to moisture and chemical degradation, that the filter cartridge 20 is typically exposed to and designed for. The retention strap 82 can be made from any suitable material. Particularly suitable materials have been found to be Hytrel® 5556 or 8238 thermoplastic polyester elastomer available from DuPont.

The material of the retention strap 82 is selected for its strength and impact resistance at the relatively elevated operating temperatures that the retention strap will be exposed to. The material of the retention strap 82 is also selected for its resistance to chemical and moisture degradation of its strength and impact resistance. The preferred thermoplastic polyester elastomer meets these design parameters. Incomplete testing has shown that the strap can withstand over 150,000 cleaning pulses and function while constantly exposed to at least 265° F., and in some cases 350° F., without losing its strength and without moving axially along the filter cartridge from the position it was initially placed in.

The retention strap 82 engages and is adhered to at least some tips 42 and perhaps some of the sides 44 of pleats 26 of the filtration media 24, as illustrated in FIG. 3. The engagement minimizes radially outward movement of the tips 42 of the pleats 26 and that the pleats are maintained spaced apart without collapsing against one another during exposure to the pressure and flow of the cleaning fluid or the particulate laden air. The adherence assures that the retention strap 82 remains in the relative axial location it was originally placed in throughout its service life.

The retention strap 82 is preferably applied to the filter cartridge during an extrusion operation. The retention strap 82 is adhered to the filtration media 24 during the extrusion operation so it does not move along the filter cartridge in a direction parallel to the axis A. During the extrusion operation, the retention strap 82 has portions 84 (FIG. 3) which are forced to extend at least partially into the region between adjacent pleats 26. This assures that there is some structure located between the pleats 26 that prevent adjacent pleats from engaging each other. The retention strap 82 is also forced to engage and adhere to tips 42 and/or sides 44 of the pleats 26 to assure that the retention strap remains in the axial position it was originally applied to the filter cartridge 20. Once the material of the retention strap 82 "cures", it has a hardness and strength sufficient to withstand the operating environment it will be exposed to for its service life and adheres to the filtration media 24.

The retention strap 82 according to an alternate embodiment of the present invention further includes reinforcement structure 86 (FIG. 4). The reinforcement structure 86 may be any suitable material but is contemplated to be textile reinforcement. The reinforcement structure 86 is introduced during the extrusion operation. The reinforcement structure 86 may be introduced during a single extrusion pass and forced into the extrudate or introduced between two separate extrusion passes.

Figure 5:
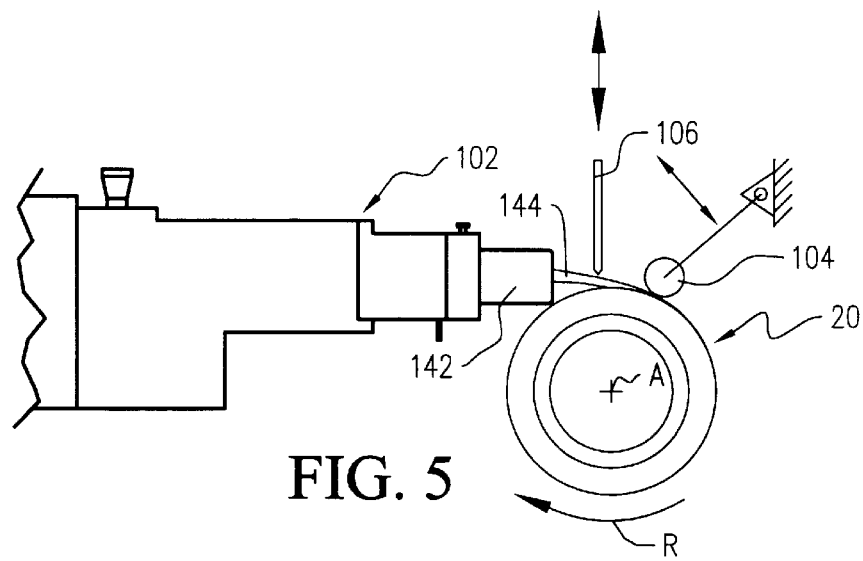
FIG. 5 is a side elevation schematic illustration of the extrusion equipment and one embodiment of the process used to apply the retention strap to the filter cartridge.
Figure 6:
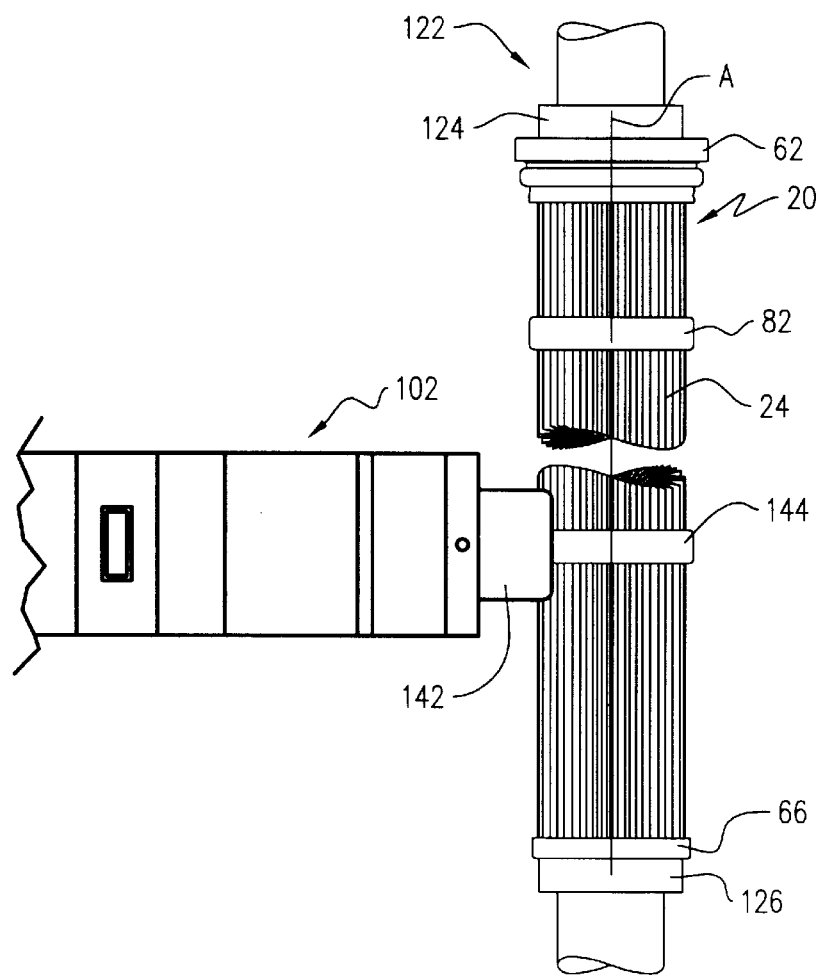
FIG. 6 is a schematic illustration of the extrusion equipment and process illustrated in FIG. 5, viewed from above.

The present invention is also directed to a method of making a filter cartridge 20 with the retention strap 82, as illustrated in FIGS. 5 and 6. The method includes an extruder 102, a pivotable application roller 104, a cutoff mechanism 106 and an optional reinforcement applicator (not shown). The method of the present invention is described below.

A filter cartridge 20 without any retention device is held in proximity to the extruder 102 by a support mechanism 122. The support mechanism 122 is adapted to hold and rotate the filter cartridge 20 during the application of an extruded retention strap 82. The support mechanism 122 includes a mounting structure holder 124 and an end cap holder 126. The mounting structure holder 124 closely fits within and supports the mounting structure 62 of the filter cartridge 20. The end cap holder 126 supports the end cap 66 of the filter cartridge 20. The support mechanism 122 positions the filter cartridge 20 so the longitudinal central axis A of the filter cartridge extends in a direction normal to a barrel 142 of the extruder 102. Either or both of the holders 124 or 126 are operably connected with a drive mechanism (not shown) to rotate the supported filter cartridge 20 under the barrel 142 of the extruder 102, in a clockwise direction as illustrated by the arrow R in FIG. 5.The filter cartridge 20 is rotated under the barrel 142 of the extruder 102 while a band of extrudate 144 is applied to the outer surface the filter cartridge 20. The application roller 104 is loaded to a predetermined force so the portions 84 of the uncured extrudate 144 is forced to deform in between adjacent pleats 26 of the filtration media 24. The application roller 104 also forces the extrudate 144 to contact tips 42 and sides 44 of pleats 26 to engage and adhere the retention strap 82 to the filtration media 24. The extrudate 144 then is allowed to cure to form the retention strap 82.In an alternate embodiment, reinforcement structure 84 may be introduced into the retention strap 82. Textile reinforcement 84 is paid off the optional reinforcement applicator. The textile reinforcement 84 is introduced into the extrudate 144. The application roller 104 forces the textile reinforcement 84 into the extrudate 144. Optionally the textile reinforcement 84 could be placed between two separate layers of extrudate 144.When circumferentially opposite ends of the extrudate 144 overlap, the cutoff mechanism 106 is activated to sever the extrudate 144. The application roller 104 then creates a unified one-piece retention strap 82 that remains in its axial relative place and supports the pleats 26 and prevents engagement between adjacent pleats.From the above description of preferred embodiments of the invention, those skilled in the art will perceive improvements, changes and modifications. Such improvements, changes and modifications within the skill of the art are intended to be covered by the appended claims.

Having described at least one preferred embodiment of the invention, what is claimed is:1. An improved filter cartridge for removing particulates from a particulate laden fluid stream moving in one direction through said filter cartridge, the filter cartridge periodically subject to cleaning fluid moving in an opposite direction to the fluid steam, the filter cartridge including a filtration media formed into a tubular configuration with a plurality of circumferentially spaced apart pleats, mounting structure at a first axial end portion of the filtration media, and an end cap at a second axial end portion of the filtration media, the filtration media retained in the generally tabular configuration by the mounting structure and the end cap; said improvement comprising:

an extruded retention device engaging the filter cartridge to limit repeated radial movement of the filtration media when subjected to the periodic cleaning fluid and to maintain the pleats in the filtration media circumferentially spaced apart, and the retention device comprising a thermoplastic polyester elastomer operable to limit repeated radial movement of the filtration media at temperatures above approximately 265° F.2. The improved filter cartridge of claim 1 wherein said retention device is attached to the filtration media to resist movement in direction parallel to a longitudinal central axis of the filter cartridge.3. The improved filter cartridge of claim 1 further including each of the pleats of the filtration media having a tip and a pair of sides extending from the tip, wherein said retention device engages at least one of the tips and sides of the pleats.4. The improved filter cartridge of claim 1 wherein said retention device further includes reinforcement structure.5. The improved filter cartridge of claim 4 wherein said reinforcement structure comprises textile material.6. The improved filter cartridge of claim 1 wherein said retention device includes a portion extending between adjacent pleats of the filtration media.7. A filter cartridge for removing particulates from a fluid stream moving one direction through said filter cartridge, the filter cartridge periodically subject to cleaning fluid moving in an opposite direction to the fluid stream, said filter cartridge comprising:

filtration media formed into a tubular configuration;

a plurality of circumferentially spaced apart pleats in said filtration media; and an extruded retention device engaging the filter cartridge to limit repeated radial movement of said filtration media in the opposite direction when subjected to the periodical cleaning fluid and to maintain said pleats in the filtration media circumferentially spaced apart, and the retention device comprising a thermoplastic polyester elastomer operable to limit repeated radial movement of the filtration media at temperatures above approximately 265° F.8. The filter cartridge of claim 7 further including each of said pleats of said filtration media having a tip and a pair of sides extending from said tip, wherein said retention device engages at least one of said tips and sides of the pleats.9. The filter cartridge of claim 7 wherein said retention device further includes reinforcement structure.10. The method of claim 9 wherein said retention structure comprises textile material.11. The filter cartridge of claim 7 wherein said retention device is attached to said filtration media to resist axial movement along said filtration media.12. The filter cartridge of claim 7 wherein said retention device includes a portion extending between adjacent pleats of the filtration media.13. A method of making a filter cartridge for removing particulates from a fluid stream moving one direction through said filter cartridge and that is periodically subject to cleaning fluid moving in an opposite direction of the fluid stream, said method comprising the steps of:

providing filtration media formed into a substantially tubular configuration and having a plurality of circumferentially spaced apart pleats formed therein; and extruding a thermoplastic polyester elastomer retention device onto the filtration media to limit repeated radial movement of said filtration media in the opposite direction when subjected to the periodical cleaning fluid and to maintain pleats in the filtration media circumferentially spaced apart at temperatures above approximately 265° F.14. The method of claim 13 wherein each pleat in the filtration media has a tip and a pair of sides extending from the tip, wherein said applying step further includes the step of providing the retention device to engage at least one of the tips and sides of the pleats.15. The method of claim 13 wherein said extruding step further comprises the step of holding and rotating the filter cartridge while applying the retention device to the filter cartridge.16. The method of claim 13 wherein the extruding step further includes the step of providing reinforcing structure in the retention device.17. The method of claim 13 further including the step of locating a portion of the retention device between adjacent pleats.18. The method of claim 13 wherein the extruding step further includes the step of attaching the retention device to the filtration media.

* * * * *